(12) United States Patent
Kimura et al.

(10) Patent No.: US 8,948,951 B2
(45) Date of Patent: Feb. 3, 2015

(54) VEHICLE BEHAVIOR CONTROL APPARATUS

(71) Applicant: Toyota Jidosha Kabushiki Kaisha, Toyota-shi, Aichi (JP)

(72) Inventors: Yukihide Kimura, Gotenba (JP); Etsuo Katsuyama, Hiratsuka (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 14/222,998

(22) Filed: Mar. 24, 2014

(65) Prior Publication Data
US 2014/0288745 A1    Sep. 25, 2014

(30) Foreign Application Priority Data
Mar. 22, 2013  (JP) .................................. 2013-59246

(51) Int. Cl.
*B60G 7/00*    (2006.01)
*B60G 17/027*  (2006.01)

(52) U.S. Cl.
USPC ............... 701/22; 280/124.125; 280/124.126; 903/930

(58) Field of Classification Search
USPC ....................... 701/22; 903/930; 280/124.125, 280/124.126; 303/189
See application file for complete search history.

(56) References Cited

U.S. PATENT DOCUMENTS

| | | | | |
|---|---|---|---|---|
| 4,883,327 A | * | 11/1989 | Farr | 303/116.4 |
| 4,893,881 A | * | 1/1990 | Farr | 303/113.5 |
| 4,941,713 A | * | 7/1990 | Farr | 303/116.4 |
| 5,066,077 A | * | 11/1991 | Farr | 303/114.1 |
| 5,501,514 A | * | 3/1996 | Resch et al. | 303/115.4 |
| 5,701,247 A | * | 12/1997 | Sasaki | 701/1 |
| 7,348,895 B2 | * | 3/2008 | Lagassey | 340/907 |

(Continued)

FOREIGN PATENT DOCUMENTS

| | | |
|---|---|---|
| JP | A-2007-161032 | 6/2007 |
| JP | A-2012-86712 | 5/2012 |

OTHER PUBLICATIONS

Postural stability evaluation of spatial wheeled mobile robots with flexible suspension over rough terrains; Alipour, K. ; Moosavian, S.A.A.; Bahramzadeh,Y.; Advanced Intelligent Mechatronics, 2008. AIM 2008. IEEE/ASME International Conference on; DOI: 10.1109/AIM.2008.4601666; Publication Year: 2008, pp. 241-246.*

(Continued)

*Primary Examiner* — Cuong H Nguyen
(74) *Attorney, Agent, or Firm* — Oliff PLC

(57) ABSTRACT

A vehicle Ve comprises six wheels of front left and right wheels FW1 FW2, middle left and right wheels MW1, MW2, and rear left and right wheels RW1, RW2. Each of in-wheel motors 21-26 is provided/installed in each of the wheels. An electronic control unit 41 calculates a target heave force for controlling a heave behavior, and a target pitching moment My for controlling a pitching behavior, using a state of a movement of a vehicle body Bo obtained from a movement state detecting sensor 43. The unit 41 calculates a driving force and a braking force of the front wheels FW1 FW2 and the rear wheels RW1, RW2, in order to achieve the calculated target heave force and the target pitching moment, and calculates a driving force and a braking force of the middle wheels MW1, MW2 for suppressing a forward-and-backward movement of the vehicle, the movement caused by independently (simultaneously) controlling the behaviors coupling with each other.

9 Claims, 4 Drawing Sheets

(56) References Cited

U.S. PATENT DOCUMENTS

| | | | |
|---|---|---|---|
| 7,789,398 B2 * | 9/2010 | Munday et al. | 280/5.507 |
| 7,983,835 B2 * | 7/2011 | Lagassey | 701/117 |
| 8,216,036 B2 * | 7/2012 | Eyzaguirre et al. | 463/2 |
| 2006/0237942 A1 * | 10/2006 | Munday et al. | 280/124.157 |
| 2010/0203933 A1 * | 8/2010 | Eyzaguirre et al. | 463/2 |

OTHER PUBLICATIONS

Simulation of a commercial electric vehicle: Dynamic aspects and performance; Terras, J.M. ; Sousa, D.M. ; Roque, A. ; Neves, A.; Power Electronics and Applications (EPE 2011), Proceedings of the 2011-14th European Conference on; Publication Year: 2011 , pp. 1-10.*

A new optimum method for sharing tire forces in electronic stability control system; Javadian, A. ; Gholami, O.; Modeling, Simulation and Applied Optimization (ICMSAO), 2011 4th International Conference on; DOI: 10.1109/ICMSAO.2011.5775547; Publication Year: 2011 , pp. 1-6.*

Electric and mechanical brake cooperative control method for FRID EVs under various severe road conditions; Mutoh, N. ; Akashi, H.; IECON 2011—37th Annual Conference on IEEE Industrial Electronics Society; DOI: 10.1109/IECON.2011.6120063 Publication Year: 2011 , pp. 4570-4576.*

* cited by examiner

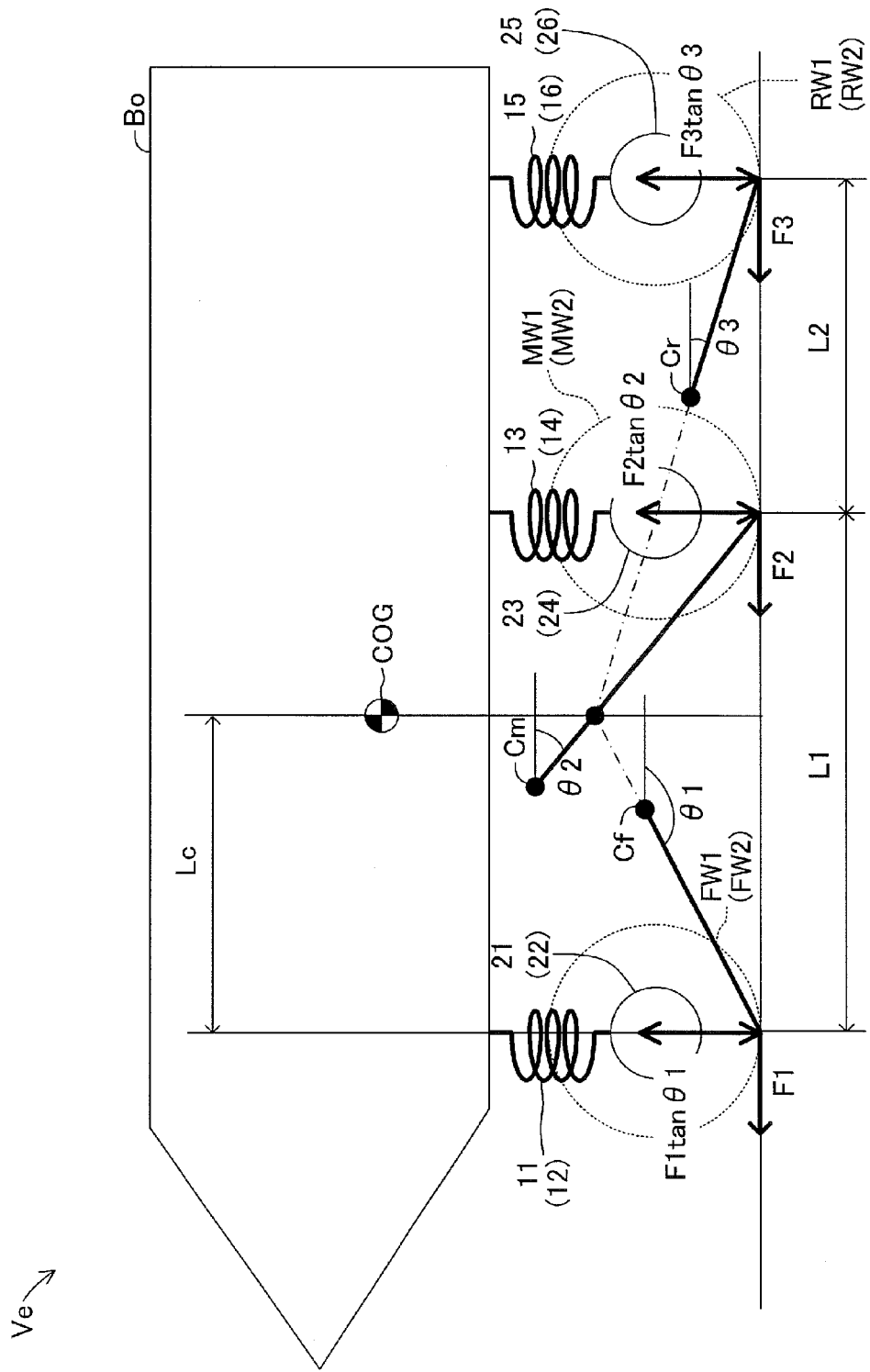

VEHICLE BEHAVIOR CONTROL APPARATUS

TECHNICAL FIELD

The present invention relates to a vehicle behavior control apparatus which controls a driving force or a braking force to be generated at (by) wheels of a vehicle in response to (in accordance with) a behavior of a vehicle body of the vehicle.

BACKGROUND ART

Recently, as one type of an electric vehicle, so-called an in-wheel motor vehicle has been developed, in which each of electric motors is arranged/installed in or in the neighborhood of each of wheels, and the wheels are directly driven by the electric motors. In the in-wheel motor vehicle, each of the electric motors is independently controlled from each other. That is, a power running control and a regenerative control are performed for each of the motors independently from the other motors. Accordingly, a driving torque and/or a braking torque of each of the wheels is independently controlled, so that a driving force and/or a braking force of the vehicle can be desirably controlled in response to a driving state/condition of the vehicle.

An apparatus which suppresses a change in a vehicle body behavior utilizing the independent control of the driving torque and/or the braking torque supplied to each of the wheels has been proposed. For example, Japanese Patent Application Laid-Open (kokai) No. 2007-161032 discloses a driving apparatus which can suppress the change in the vehicle body behavior caused by a variation in a sprung (springing) weight of a suspension. This conventional driving apparatus is configured to determine a driving force distribution ratio for the front wheels and a driving force distribution ratio for the rear wheels when suppressing a bouncing of the vehicle, and to determine a driving force distribution ratio for the front wheels and a driving force distribution ratio for the rear wheels when suppressing a pitching of the vehicle.

Japanese Patent Application Laid-Open (kokai) No. 2012-086712 discloses a braking/driving force control apparatus for a vehicle, which simultaneously controls a plurality of changes in behavior of a vehicle body. This conventional braking/driving force control apparatus is configured to calculate a target forward-and-backward driving force, a target roll moment, a target pitching moment, and a target yaw moment, and to calculate each driving force to be generated at each of four wheels such that those targets are simultaneously achieved/realized.

SUMMARY OF THE INVENTION

In each of the above described apparatuses, an in-wheel motor is provided/installed in each of the wheels, and the driving force and the braking force (braking/driving force) for each of the wheels are independently controlled, so as to control the behavior appearing in (of) the vehicle body (sprung article/suspended portion/springing article) utilizing reaction forces generated by means of suspension mechanisms. For example, when a bouncing behavior (heave behavior) is occurring in which both a front side portion and a rear side portion of the vehicle body vibrate vertically in the substantially same phase with each other, the braking/driving forces of the wheels are controlled so as to generate the reaction forces by means of the suspension mechanisms, in order to suppress the behavior. In this case, if a magnitude of the reaction force generated by the front side suspension mechanism is the same as a magnitude of the reaction force generated by the rear side suspension mechanism when a braking/driving force having the same magnitude is added to each of the wheels (hereinafter, the vehicle having such kind of front and rear side suspension mechanisms is referred to as a "vehicle having a front-rear symmetry"), the heave behavior can be suppressed without generating an unnecessary forward-and-backward movement of the vehicle. However, when a pitching behavior is generating in which both the front side portion and the rear side portion of the vehicle body (suspended portion) vibrate vertically in the substantially opposite phase to each other, it is necessary to have the magnitude of the reaction force generated by the front side suspension mechanism and the magnitude of the reaction force generated by the rear side suspension mechanism be different from each other, and is necessary to have the directions of application of the reaction forces applied to the vehicle body (suspended portion) generated by the front side suspension mechanism and the rear side suspension mechanism be different from each other, in order to suppress the pitching behavior, under the front-rear symmetry. Accordingly, it is necessary to have the braking/driving force applied to the front wheels and the braking/driving force applied to the rear wheels be different from each other. That is, it is necessary to generate the forward-and-backward movement in order to suppress the generated pitching behavior under the front-rear symmetry is maintained.

In the meantime, generally, the reaction forces generated by the suspension mechanisms are asymmetric between the front wheels side and the rear wheels side. Further, the weight distribution of the vehicle is also asymmetric between the front wheels side and the rear wheels side. Thus, generally, the heave behavior and the pitching behavior occur simultaneously (or, generated by being coupled). In this case, as opposed to the case of the front-rear symmetry, the asymmetric diversity between the front wheels side and the rear wheels side increases, it becomes more easy to suppress the pitching behavior without generating the forward-and-backward movement, and is necessary to generate the forward-and-backward movement to suppress the heave behavior.

It is extremely important to suppress the heave behavior and the pitching behavior of the vehicle body (suspended portion), for a driver when the driver runs the vehicle, whereas, the driver may feel an uncomfortable feeling against the forward-and-backward movement which occurs when suppressing those behaviors. It is therefore desired to suppress the heave behavior of the vehicle body and the pitching behavior of the vehicle body independently from each other (and simultaneously) without generating the unnecessary forward-and-backward movement of the vehicle.

The present invention has been made to solve such a problem, and one of objects of the present invention is to provide a vehicle behavior control apparatus which controls the behavior appeared on the vehicle body of the vehicle by being coupled, while suppressing the unnecessary generation of the forward-and-backward movement.

The vehicle behavior control apparatus according to the present invention comprises a force generating mechanism, a suspension mechanism, and a control section, in order to achieve the above described object.

The force generating mechanism makes/has front wheels and rear wheels of the vehicle generate a driving force or a braking force, independently from each other. The suspension mechanism connects the front wheels and the rear wheels, both arranged as unsprung (unspringing) articles of the vehicle, to a vehicle body arranged as a sprung (springing) article of the vehicle. The control section controls the driving force or the braking force that the force generating mechanism makes/has the front wheels and the rear wheels generate, in response to (based on) behaviors of (appeared on) the vehicle body.

Features of the vehicle behavior control apparatus according to the present invention are as follows.

The force generating mechanism makes/has wheels provided separately from the front and the rear wheels generate the driving force or the braking force, independently.

The control section:

obtains a state of a movement of (appeared on) the vehicle body when the vehicle is running;

calculates, based on the obtained state of the movement, a plurality of target movement state amounts for controlling at least behaviors which are coupled with each other among behaviors of the vehicle body;

calculates the driving force or the braking force that the force generating mechanism makes/has the front and rear wheels generate, and the driving force or the braking force that the force generating mechanism makes/has the wheels provided separately from the front and rear wheels generate, such that a plurality of the calculated target movement state amounts are realized/achieved; and controls an operation of the force generating mechanism using signals indicative of the calculated driving force or the calculated braking force that the force generating mechanism makes/has the front and rear wheels generate, and signal indicative of the calculated driving force or the calculated braking force that the force generating mechanism makes/has the wheels provided separately from the front and rear wheels generate.

In this case, the suspension mechanism may further connect the wheels provided as unsprung articles separately from the front and rear wheels to the vehicle body. In those cases, for example, the wheels provided separately from the front and rear wheels may be disposed/arranged between the front wheels and the rear wheels. In those cases, for example, the force generating mechanism may include (be) electric motors, each of which is installed/arranged in each of the wheels of the vehicle.

In those cases, the control section may calculate the driving force or the braking force that the force generating mechanism makes/has the front and rear wheels generate, and the driving force or the braking force that the force generating mechanism makes/has the wheels provided separately from the front and rear wheels generate, using a distribution geometrically determined based on a geometry (arrangement) among at least the front and rear wheels and the suspension mechanism within the vehicle, such that a plurality of the calculated target movement state amounts are realized/achieved.

In addition, in those cases, the behaviors that couples with each other may be the heave behavior in which the front side portion and the rear side portion of the vehicle body vibrate vertically in the substantially same phase with each other, and the pitching behavior in which both the front side portion and the rear side portion of the vehicle body vibrate vertically in the substantially opposite phase to each other, and the control section may calculate, as a plurality of the target movement state amounts, at least, a target heave force for suppressing the heave behavior and a target pitching moment for suppressing the pitching behavior. Further, in this case, the control section may calculate the driving force or the braking force that the wheels provided separately from the front and rear wheels are made to generate such that at least the forward-and-backward movement of the vehicle is suppressed, the forward-and-backward movement being caused by the driving force or the braking force that the front and rear wheels generate to achieve/realize the calculated target heave force and the target pitching moment.

According to the configurations described above, when the driving force or the braking force of the front and rear wheels is controlled to generate the target heave force and the target pitching moment for suppressing the heave behavior and the pitching behavior that occur on the vehicle body while coupling with each other, the forward-and-backward movement of the vehicle may occur. The control section, however, can control the driving force or the braking force of the wheels (intermediate/middle wheels) provided separately from the front and rear wheels in accordance with (in addition to) the control of the driving force or the braking force of the front and rear wheels, so that the forward-and-backward movement is suppressed. Accordingly, for example, the heave behavior and the pitching behavior, coupled with each other, can be controlled independently (and simultaneously) without causing the unnecessary forward-and-backward movement of the vehicle. As a result, the driver does not feel/notice the unpleasant forward-and-backward movement of the vehicle.

In those cases, the control section may comprise a movement state detecting section, an input section, a vehicle body behavior control value calculating section, and a driving force calculating section. Further, the control section may comprise an operating state detecting section, as necessary.

The operating state detecting section may detect an operating state of the driver for running the vehicle. The operating state to be detected may include an operating amount of a steering wheel, an operating amount of an acceleration pedal, an operating amount of a brake pedal, and the like. The movement state detecting section may detect a state (motion state) of a movement occurring on the vehicle body while the vehicle is running. The movement state to be detected may include an upward-and-downward acceleration which is an acceleration of the vehicle body arranged as the sprung article along an upward-and-downward direction of the vehicle body, a side acceleration which is an acceleration of the vehicle body along a right-and-left direction of the vehicle body, a vehicle speed which is a speed of the vehicle body (vehicle), a pitch rate of the vehicle body, a stroke amount of the suspension mechanism, and the like. The input section may obtain the state of the movement detected by the movement state detecting section, and obtain the operating state detected by the operating state detecting section, as necessary.

The vehicle body behavior control value calculating section may calculate, based on the state of the movement obtained by the input section, a plurality of target movement state amounts for controlling at least behaviors which are coupled with each other among the behaviors of the vehicle body. For example, if the behaviors that couples with each other are the heave behavior and the pitching behavior, a plurality of the target movement state amounts may be the target heave force for controlling the heave behavior having the vibration along the upward-and-downward direction of the vehicle body, and the target pitching moment for controlling the pitching behavior of the vehicle body. Further, the vehicle body behavior control value calculating section may calculate, based on the operating state obtained by the input section, a target forward-and-backward driving force for running the vehicle.

The driving force calculating section calculates the driving force or the braking force that the force generating mechanism makes/has the front and rear wheels generate, and the driving force or the braking force that the force generating mechanism makes/has the wheels provided separately from the front and rear wheels generate, such that a plurality of the target movement state amounts calculated by the vehicle body behavior control value calculating section are realized/achieved. In this case, both the driving force or the braking force that the force generating mechanism makes/has the front and rear wheels generate, and the driving force or the braking force that the force generating mechanism makes/has the wheels provided separately from the front and rear wheels generate can be calculated, using the distribution geometrically determined based on the geometry (arrangement) among at least the front and rear wheels and the suspension mechanism within the vehicle, such that a plurality of the calculated target movement state amounts are realized/achieved.

In another aspect of the vehicle behavior control apparatus according to the present invention, the control section may set "both the driving force or the braking force that the force generating mechanism makes/has the front and rear wheels generate, and the driving force or the braking force that the force generating mechanism makes/has the wheels provided separately from the front and rear wheels generate" at (to) zero such that a plurality of the calculated target movement state amounts are realized/achieved, when an operating state of the suspension mechanism depending on (according to) the change in the behavior of the vehicle body satisfies a predetermined condition. More specifically, the predetermined condition is a condition which momentary rotation angles should satisfy, the momentary rotation angles being indicative of an operating state of the suspension mechanism, and corresponding to a change in height of the vehicle body caused by the change in behavior of the vehicle body. The control section may determine to set "both the driving force or the braking force that the force generating mechanism makes/has the front and rear wheels generate, and the driving force or the braking force that the force generating mechanism makes/has the wheels provided separately from the front and rear wheels generate" at (to) zero such that a plurality of the calculated target movement state amounts are realized/achieved, when the momentary rotation angles of the suspension mechanism satisfy the predetermined condition, the momentary rotation angles being obtained according to the change in the height of the vehicle body when the vehicle is running.

According to the configurations described above, the driving force or the braking force that each of the wheels generates for controlling the behavior of the vehicle body can be determined to be set to zero, when the predetermined condition is satisfied depending on a change in the momentary rotation angles when the suspension mechanism (apparatus) operates. For example, this state is a state in which it becomes difficult to independently (simultaneously) control the heave behavior and the pitching behavior due to a change in forces (property) that are input into the vehicle body, when the driving force or the braking force that the front and rear wheels generate, and the driving force or the braking force that the wheels provided separately from the front and rear wheels generate change. Accordingly, an influence caused by the change in the forces (property) input into the vehicle body, as well as the generation of the unnecessary forward-and-backward movement can be effectively reduced. Other objects, features, and advantages of the present invention will be readily understood from the following description of embodiments of the present invention with reference to the accompanying drawings.

BRIEF DESCRIPTION OF THE DRAWINGS

FIG. 4 is a drawing for describing a condition (that is a mutual dependent condition) in which independent controls for a heave behavior and a pitching behavior become impossible in the vehicle shown in FIG. 1.

DESCRIPTION OF EMBODIMENTS

Figure 1:
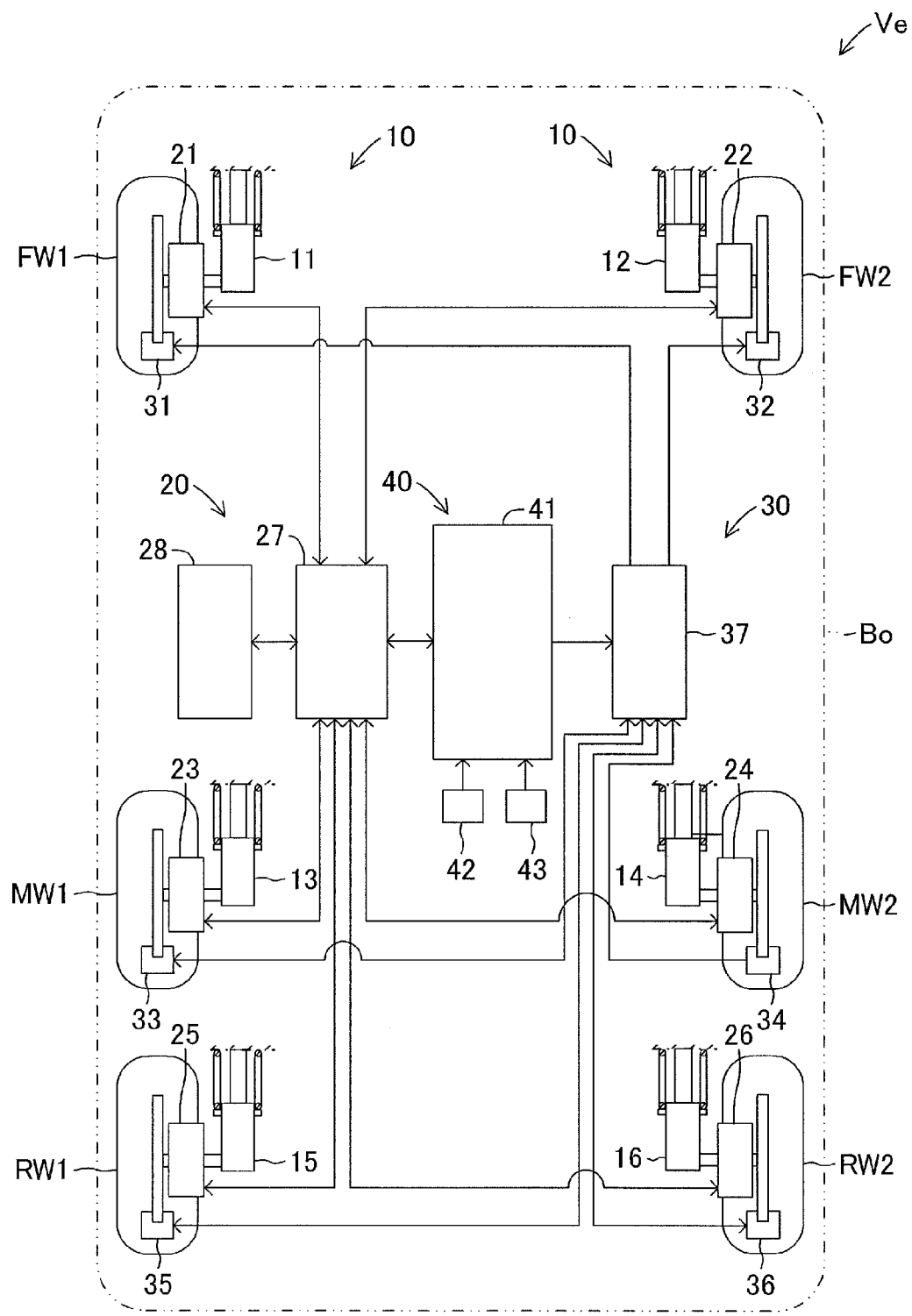
FIG. 1 is a schematic view schematically showing a configuration of a vehicle to which a vehicle behavior control apparatus according to an embodiment of the present invention can be applied.

An embodiment of the present invention will be described with reference to the drawings in detail. FIG. 1 schematically shows a configuration of a vehicle Ve on which a vehicle behavior control apparatus according to the present embodiment is mounted.

The vehicle Ve comprises front left and right wheels FW1 FW2, middle left and right wheels MW1, MW2, and rear left and right wheels RW1, RW2. The front left and right wheels FW1 FW2, the middle left and right wheels MW1, MW2, and the rear left and right wheels RW1, RW2 are supported by a vehicle body Bo serving as a sprung (springing) article (suspended member) of the vehicle Ve through a suspension 10. Specifically, the front left and right wheels FW1 and FW2 are supported by the vehicle body Bo through suspension mechanisms 11, and 12, respectively, and independently from each other. The middle left and right wheels MW1, and MW2 are supported by the vehicle body Bo through suspension mechanisms 13, and 14, respectively, and independently from each other. The rear left and right wheels RW1, and RW2 are supported by the vehicle body Bo through suspension mechanisms 15, and 16, respectively, and independently from each other. The structure of each of the suspension mechanisms 11-16 does not directly relate to the present invention, and thus, the detail description is omitted, however, any of the following known suspension mechanisms can be adopted; a strut-type suspension comprising a built-in shock absorber strut, a coil spring, a suspension arm, and so on; a wishbone type suspension comprising a coil spring, a shock absorber, upper and lower suspension arms, and so on; or the like.

The vehicle Ve comprises a force generating mechanism 20 which makes/has each of the front left and right wheels FW1, FW2, the middle left and right wheels MW1, MW2, and the rear left and right wheels RW1, RW2 generate a driving force or a braking force independently from each other. Specifically, electric motors 21, 22, constituting the force generating mechanism 20 are installed/arranged in the front left and right wheels FW1, FW2, respectively. The electric motors 21 and 22 are power-transmissively connected to the front left and right wheels FW1 and FW2, respectively. Electric motors 23, 24, constituting the force generating mechanism 20 are installed/arranged in the middle left and right wheels MW1, MW2, respectively. The electric motors 23 and 24 are power-transmissively connected to the middle left and right wheels MW1 and MW2, respectively. Further, electric motors 25, 26, constituting the force generating mechanism 20 are installed/arranged in the rear left and right wheels RW1, RW2, respectively. The electric motors 25 and 26 are power-transmissively connected to the rear left and right wheels RW1 and RW2, respectively. That is, the electric motors 21-26 are so-called in-wheel motors 21-26, and are arranged as unsprung articles of the vehicle Ve, together with the front left and right wheels FW1, FW2, the middle left and right wheels MW1, MW2, and the rear left and right wheels RW1, RW2. The driving force or the braking force, which the front left and right wheels FW1, FW2, the middle left and right wheels MW1, MW2, and the rear left and right wheels RW1, RW2 generate, can be controlled independently from each other, by controlling a rotation of each of the in-wheel motors 21-26.

Each of the in-wheel motors 21-26 is, for example, an AC synchronous motor. DC electric power from an electric power storage device 28, such as a battery and a capacitor, is converted into the AC electric power through an inverter 27. The converted AC electric power is supplied to each of the in-wheel motors 21-26, so that each of the in-wheel motors 21-26 is driven (power running). As a result, the driving force (driving torque) is applied to each of the front left and right wheels FW1, FW2, the middle left and right wheels MW1, MW2, and the rear left and right wheels RW1, RW2. Each of the in-wheel motors 21-26 can be regeneratively controlled (regenerative control can be performed for each motor) utilizing rotational energy of the front left and right wheels FW1, FW2, the middle left and right wheels MW1, MW2, and the rear left and right wheels RW1, RW2. That is, when the in-wheel motors 21-26 generate electric power (when the regenerative control is performed), the rotational energy (kinetic energy) of the front left and right wheels FW1, FW, the middle left and right wheels MW1, MW2, and the rear left and right wheels RW1, RW2 is converted into the electric energy by the in-wheel motor 21-26, and the electric power generated at that time is stored in the electric power storage device 28 through the inverter 27. During that time, the braking force (braking torque) owing to the regeneration (power generation) is applied to the front left and right wheels FW1, FW2, the middle left and right wheels MW1, MW2, and the rear left and right wheels RW1, RW2.

A braking device 30 is provided between each of the front left and right wheels FW1 FW2, the middle left and right wheels MW1, MW2, and the rear left and right wheels RW1, RW2 and each of the corresponding in-wheel motors 21-26, respectively. Specifically, a braking mechanism 31 is provided between the front left wheel FW1 and the in-wheel motor 21, and a braking mechanism 32 is provided between the front right wheel FW2 and the in-wheel motor 22. A braking mechanism 33 is provided between the middle left wheel MW1 and the in-wheel motor 23, and a braking mechanism 34 is provided between the middle right wheel MW2 and the in-wheel motor 24. A braking mechanism 35 is provided between the rear left wheel RW1 and the in-wheel motor 25, and a braking mechanism 36 is provided between the rear right wheel RW2 and the in-wheel motor 26. For example, each of the braking mechanisms 31-36 is a disc brake or a drum brake. Each of the braking mechanisms 31-36 makes/has each of the front left and right wheels FW1, FW2, the middle left and right wheels MW1, MW2, and the rear left and right wheels RW1, RW2 generate a braking force using a hydraulic pressure generated by an unillustrated master cylinder. For this purpose, a brake actuator 37 which controls the generated hydraulic pressure is connected to the braking mechanisms 31-36.

Each of the inverter 27 and the braking actuator 37 is connected to the control device (controller) 40, which controls a state of each of the in-wheel motors 21-26 and a state of each of the braking mechanisms 31-36. The control device 40 comprises an electronic control unit 41.

The electronic control unit 41 includes, as a main component, a microcomputer including a CPU, a ROM, a RAM, and so on, and executes a various programs. The electronic control unit 41 is configured to receive signals from inverter 27 and various sensors, such as an operating state detecting sensor 42 for detecting an operating state changed by the driver for running the vehicle Ve, and a movement state detecting sensor 43 for detecting a state (motional state) of a movement/motion appearing (occurring) on the vehicle body Bo serving as the sprung article of the running vehicle Ve.

For example, the operating state detecting sensor 42 may comprise (or be constituted by) a steering angle sensor which detects a driver's operating amount (steering angle) of an unillustrated steering wheel, an acceleration pedal sensor which detects a driver's operating amount (acceleration pedal stroke, acceleration pedal angle, pressure applied to the acceleration pedal, or the like) of an unillustrated acceleration pedal, a brake sensor which detects driver's operating amount (brake pedal stroke, brake pedal angle, pressure applied to the brake pedal, or the like) of an unillustrated brake pedal, or the like.

For example, the movement state detecting sensor 43 may comprise (or be constituted by) an upward-and-downward acceleration sensor which detects an upward-and-downward acceleration being an acceleration of the vehicle body Bo (serving as the sprung article) in the upward-and-downward direction, a pitch rate sensor which detects a pitch rate occurring/appearing on the vehicle body Bo (vehicle Ve), a vehicle speed sensor which detects a speed of the vehicle body Bo (vehicle Ve), a stroke sensor which detects a stroke amount of each of the suspension mechanisms 11-16, or the like.

In this manner, the sensors 42, 43 and the invert 27 are connected to the electronic control unit 41, and each of the signals from the sensors 42, 43 and the invert 27 are supplied to the electronic control unit 41. Therefore, the electronic control unit 41 can control a behavior of the vehicle while/by obtaining the running state of the vehicle Ve and the behavior of the vehicle body Bo.

Here, a control on the running state of the vehicle Ve is more specifically described. The electronic control unit 41 can calculate, based on the signals from the operating state detecting sensor 42, a required driving force according to the acceleration operating amount when, for example, the driver operates the acceleration pedal. The required driving force is a driving force which the in-wheel motors 21-26 should generate so as to run the vehicle Ve in accordance with a driver's request. Further, the electronic control unit 41 can calculate, based on the signals from the operating state detecting sensor 42, a required braking force according to the braking operating amount when, for example, the driver operates the brake pedal. The required braking force is a braking force which the in-wheel motors 21-26 and the braking mechanisms 31-36 should generate in a coordinated manner, so as to decelerate the vehicle Ve in accordance with a driver's request. In addition, the electronic unit 41 makes/has each of the in-wheel motors 21-26 generate an output torque (motor torque) corresponding to the required driving force, and/or an output torque (motor torque) corresponding to the required braking force, based on the signals supplied to the unit 41 from the inverter 27, specifically, signals indicative of a power amount or a current value supplied to each of the in-wheel motors 21-26 when a power running control is performed, and signal indicative of a power amount or a current value obtained from each of the in-wheel motors 21-26 when a regenerative control is performed.

In the above manner, the electronic control unit 41 can output the signals for the power running control or the regenerative control of each of the in-wheel motors 21-26, and the signals for controlling the braking operation or the cancellation of the braking operation of each of the braking mechanisms 31-36 through the brake actuator 37. Accordingly, the electronic control unit 41 can calculate at least the required driving force and the required braking force, each required for the vehicle Ve, based on the signals from the operating state detecting sensor 42. In addition, the electronic control unit 41 can output the signals for controlling the power running state/regenerative state of each of the in-wheel motors 21-26, and the signals for controlling the operation of the brake actuator 37 (i.e., braking mechanisms 31-36), so that it can control the running state of the vehicle Ve.

Further, the electronic control unit 41 can control, based on the signals from the operating state detecting sensor 42 and the movement state detecting sensor 43, the behavior of the vehicle body Bo (serving as the sprung article). The detail description on the control of the behavior of the vehicle body B0 will follow.

The electronic control unit 41 appropriately controls a distribution of the driving force (or the braking force) that the in-wheel motors 21-26 generate so that the unit 41 runs the vehicle Ve, and controls the heave behavior and the pitching behavior independently from each other (simultaneously), those behaviors occurring/appearing while coupling with each other on the vehicle body Bo serving as the sprung article (suspended portion). In order to perform the control, the electronic control unit 41 executes a vehicle body behavior control program shown by a flowchart in FIG. 2. It should be noted that each of the heave behavior and the pitching behavior is a behavior of the vehicle body Bo (sprung article) with a vertical vibration (vibration in the upward-and-downward direction) of the body Bo, however, the heave behavior is a behavior in which both the front side portion and the rear side portion of the vehicle body Bo vibrate in the upward-and-downward direction in the substantially same phase with each other, whereas, the pitching behavior is different from the heave behavior in that the pitching behavior is a behavior in which the front side portion and the rear side portion of the vehicle body Bo vibrate in the upward-and-downward direction in the substantially opposite phase to each other.

Figure 2:
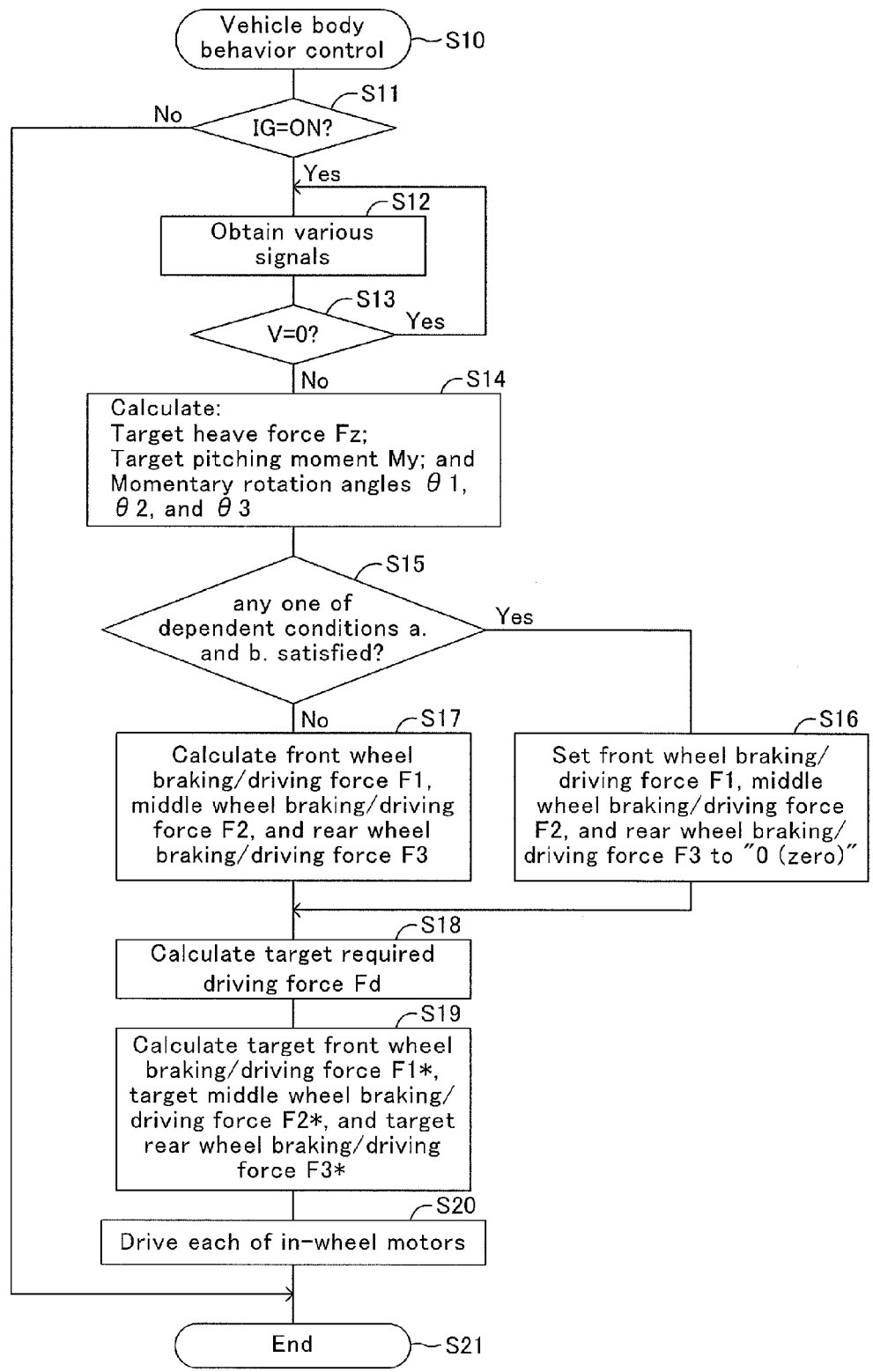
FIG. 2 is a flowchart of a vehicle behavior control program executed by a controller (more specifically, an electronic control unit) shown in FIG. 1.

The electronic control unit 41 (more specifically, the CPU) repeatedly executes the vehicle body behavior control program shown in FIG. 2, every elapse of a predetermined short time period. Specifically, the electronic control unit 41 starts the execution of the vehicle body behavior control program from step S10, and determines whether or not an unillustrated ignition switch (IG) is in an ON state at step S11 following to step S10. When the ignition switch is in the ON state, the control unit 41 makes a "Yes" determination at step S11 based on, for example, a signal obtained through a communication line (e.g., CAN communication line, or the like) constructed in the vehicle Ve, to proceed to step S12. On the other hand, when the ignition switch is in an OFF state, the control unit 41 makes a "No" determination at step S11 to proceed to step S21 to end the execution of the present program tentatively. In this case, when the ignition switch is changed into the ON state again by the driver, the control unit 41 repeatedly executes the vehicle body behavior control program every elapse of the predetermined short time period, as described below.

At step S12, the control unit 41 obtains the signals from the operating state detecting sensor 42, the movement state detecting sensor 43, and the inverter 27. Specifically, the control unit 41 obtains, based on the signals from the operating state detecting sensor 42, the steering angle of the steering wheel 11, the acceleration operating amount or a throttle valve opening according to the operation of the acceleration pedal, the braking operation amount according to the operation of the brake pedal, or the like. The control unit 41 obtains, based on the signals from the movement state detecting sensor 43, the vehicle speed of the vehicle body Bo (vehicle Ve), the upward-and-downward acceleration of the vehicle body Bo, the pitch rate of the vehicle body Bo, and the stroke amount of each of the suspension mechanisms 11-16, or the like. Further, the control unit 41 obtains, based on the signals from the inverter 27, the power amount and the current value (i.e., driving current, and the like) of each of the in-wheel motors 21-26. After the control unit 41 obtains predetermined various physical amounts from the operating state detecting sensor 42, the movement state detecting sensor 43, and the inverter 27, the control unit 41 proceeds to step S13.

At step S13, the control unit 41 determines whether or not a vehicle speed indicative of the vehicle speed of the vehicle body Bo (Vehicle Ve) obtained from the movement state detecting sensor 43 at step S12 is "0." If the obtained vehicle speed v is "0", the vehicle Ve is not running, and therefore, it is not necessary to control the behavior (specifically, the heave behavior or the pitching behavior) of the vehicle body Bo. Accordingly, the control unit 41 makes a "Yes" determination at step S13 to return to step S12, at which it obtains the predetermined various signals again. In contrast, if the obtained vehicle speed v is not "0", the vehicle Ve is running, and therefore, it is necessary to control the heave behavior and/or the pitching behavior of (occurring on) the vehicle body Bo. Accordingly, the control unit 41 makes a "No" determination at step S13 to proceed to step S14.

Figure 3:
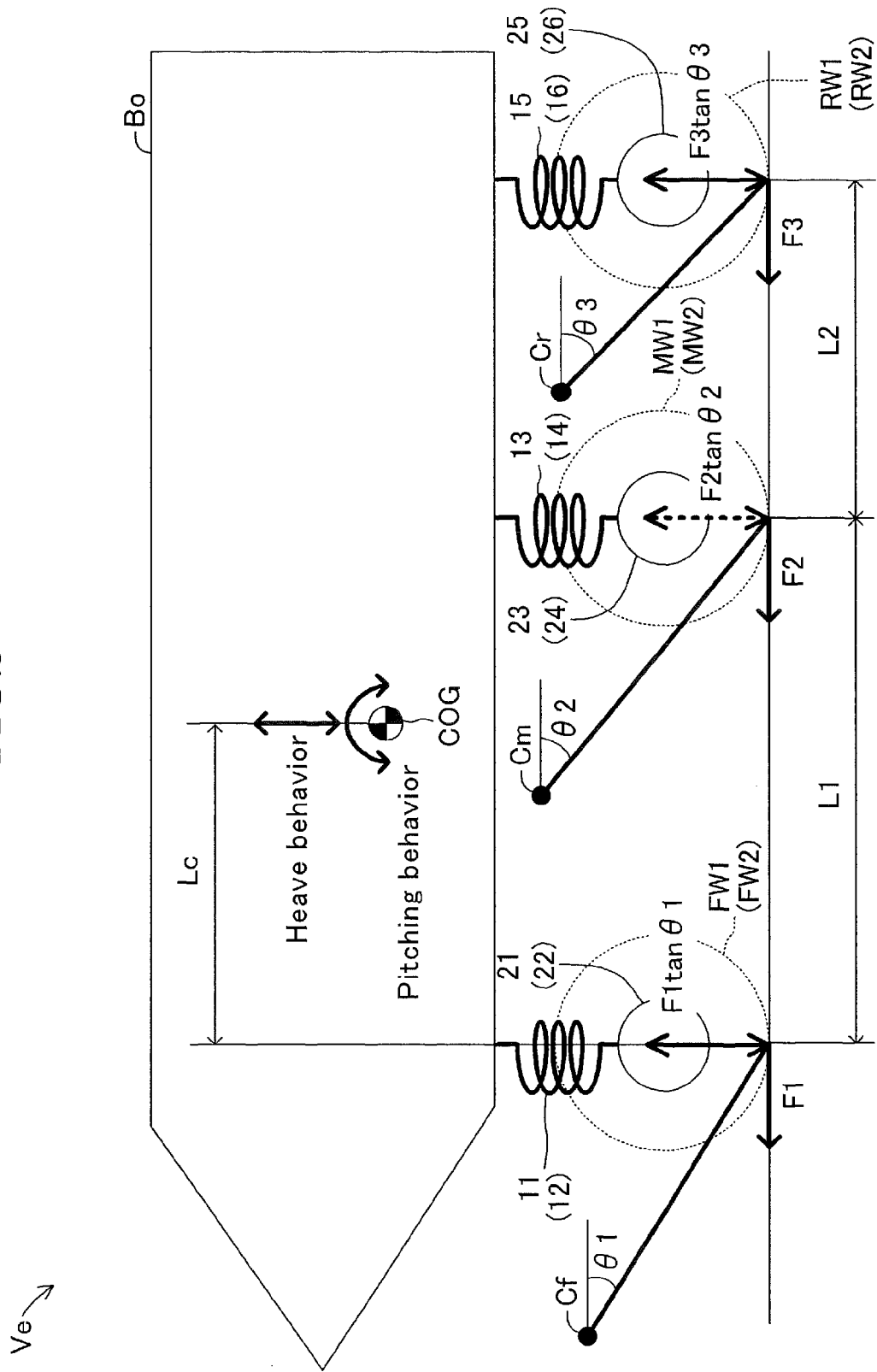
FIG. 3 is a drawing which shows a suspension geometry in the vehicle shown in FIG. 1, and which describes forces input into the vehicle body when making/having each of wheels generate a driving/braking force in that suspension geometry.

At step S14, the control unit 41 calculates a control instruction values for controlling the heave behavior and the pitching behavior of (occurring/appearing on) the vehicle body Bo. Specifically, the control unit 41 calculates a target heave force Fz for controlling (suppressing) the heave behavior (more specifically, same phase-like vibration behavior in the upward-and-downward direction of the vehicle Ve which is the heave direction), and a target pitching moment My for controlling (suppressing) the pitching behavior (more specifically, opposite phase-like vibration behavior around a pitching axis elongating in the leftward-and-rightward direction of the vehicle Ve). Further, as shown in FIG. 3, the control unit 41 calculates momentary rotation angles $\theta 1$, $\theta 2$, and $\theta 3$, respectively varying depending on changes in heights at positions of the front left and right wheels FW1, FW2, the middle left and right wheels MW1, MW2, and the rear left and right wheels RW1, RW2. The target heave force Fz and the target pitching moment My are calculated using known methods, and thus, the detail description is omitted. However, brief explanation of the calculation will be described below.

Firstly, as for the calculation of the target heave force Fz, the control unit 41 uses the upward-and-downward acceleration of the vehicle body Bo, obtained (input) at step S12 described above, and a mass of the vehicle body Bo obtained beforehand, to calculate the target heave force which has a predetermined/defined relation with both the upward-and-downward acceleration and the mass of the vehicle body Bo. As for the calculation of the target pitching moment My, the control unit 41 uses the detected values including the acceleration operating amount, the throttle valve opening, the braking operation amount, the vehicle speed, the pitch rate, the stroke amounts, or the like, obtained (input) at step S12 described above, to calculate the target pitching moment My which has a predetermined/defined relation with those detected values. As for the calculation of the momentary rotation angles θ1, θ2, and θ3, the control unit 41 calculates those angles using, for example, the stroke amounts (corresponding to heights of corresponding portions of the vehicle) of the suspension mechanisms 11-16 obtained (input) at step S12 described above and a pre-obtained geometric arrangement/disposition (so called, a suspension geometry) of each of the suspension mechanisms 11-16 with respect to (relative to) the vehicle body Bo. After the control unit calculates the target heave force Fz, the target pitching moment My, and the momentary rotation angles θ1, θ2, and θ3 in the above manner, it proceeds to step S15.

The vehicle Ve of the present embodiment comprises the six wheels of the front left and right wheels FW1, FW2, the middle left and right wheels MW1, MW2, and the rear left and right wheels RW1, RW2, and each of the in-wheel motors 21-26 is installed/provided in each of those six wheels. Accordingly, each of those six wheels can generate the driving force (or the braking force) independently from each other. It should be noted that, the present embodiment is described as a three-wheel model assuming that the front left and right wheels FW1 and FW2 are left-right symmetric, the middle left and right wheels MW1 and MW2 are left-right symmetric, and the rear left and right wheels RW1 and RW2 are left-right symmetric, in order to facilitate understanding of the description below.

Specifically, the control unit 41 calculates:

a braking/driving force F1 of the front left and right wheels FW1, FW2 (hereinafter, referred to as a front wheel braking/driving force F1);

a braking/driving force F2 of the middle left and right wheels MW1, MW2 (hereinafter, referred to as a middle wheel braking/driving force F2); and a braking/driving force F3 of the rear left and right wheels RW1, RW2 (hereinafter, referred to as a rear wheel braking/driving force F3);

according to the formula 1 described below, which uses the target heave force Fz, the target pitching moment My, and the momentary rotation angles θ1, θ2, and θ3, all calculated at step S14, as well as a target forward-and-backward driving force Fx which should be applied to the vehicle body Bo (vehicle Ve) which is running, along the forward-and-backward direction.

$$\begin{bmatrix} F1 \\ F2 \\ F3 \end{bmatrix} = \begin{bmatrix} 1 & 1 & 1 \\ \tan\theta1 & \tan\theta2 & \tan\theta3 \\ -Lc\tan\theta1 & (L1-Lc)\tan\theta2 & (L1+L2-Lc)\tan\theta3 \end{bmatrix}^{-1} \begin{bmatrix} Fx \\ Fz \\ My \end{bmatrix}$$

Formula 1

The formula above is more specifically explained with referring to FIG. 3. For discussing the geometric arrangement (disposition, layout) of the front left and right wheels FW1, FW2, the middle left and right wheels MW1, MW2, and the rear left and right wheels RW1, RW2, (that is, the geometric arrangement of the suspension mechanisms 11-16), a distance between a gravity center COG of the vehicle Ve and a wheel axle of the front left and right wheels FW1, FW2 is defined as Lc, a distance between the wheel axle of the front left and right wheels FW1, FW2 and a wheel axle of the middle left and right wheels MW1, MW2 is defined as L1, a distance between the wheel axle of the middle left and right wheels MW1, MW2 and a wheel axle of the rear left and right wheels RW1, RW2 is defined as L2. In addition, as described above, it is assumed that the front left and right wheels FW1 and FW2 are left-right symmetric, the middle left and right wheels MW1 and MW2 are left-right symmetric, and the rear left and right wheels RW1 and RW2 are left-right symmetric. Thus, as shown in FIG. 3, in the vehicle Ve having the above geometric arrangement, the momentary rotation angles θ1, θ2, and θ3, varying depending on the stroke amount of each of the suspension mechanisms 11-16 (height changes of the vehicle Ve at respective positions), are determined.

That is, the momentary rotation angle θ1 is represented by an angle between the horizontal line and a line connecting a "momentary center Cf of strokes of the front left and right wheels FW1, FW2, that are supported by the suspension mechanisms 11, 12, respectively" with a "contact point (with a road) of the front left and right wheels FW1, FW2." The momentary rotation angle θ2 is represented by an angle between the horizontal line and a line connecting a "momentary center Cm of strokes of the middle left and right wheels MW1, MW2, that are supported by the suspension mechanisms 13, 14, respectively" with a "contact point (with a road) of the middle left and right wheels MW1, MW2." The momentary rotation angle θ3 is represented by an angle between the horizontal line and a line connecting a "momentary center Cr of strokes of the rear left and right wheels RW1, RW2, that are supported by the suspension mechanisms 15, 16, respectively" with a "contact point (with a road) of the rear left and right wheels RW1, RW2."

In this case, in order to control the heave behavior and the pitching behavior of (occurring/appearing on) the vehicle body Bo, it is assumed that the front left and right wheels FW1, FW2 generate the front wheel braking/driving force F1, the middle left and right wheels MW1, MW2 generate the middle wheel braking/driving force F2, and the rear left and right wheels RW1, RW2 generate the rear wheel braking/driving force F3. At this time, a component force of the generated front wheel braking/driving force F1 can be generated (that is, an upward-and-downward force F1·tan θ1 which acts in the upward-and-downward direction (vertical direction) as a reaction force of the suspension mechanisms 11, 12 for the front left and right wheels FW1, FW2 by (in) the suspension mechanism 11, 12 can be generated). Further, a component force of the generated middle wheel braking/driving force F2 can be generated (that is, an upward-and-downward force F2·tan θ2 which acts in the upward-and-downward direction (vertical direction) as a reaction force of the suspension mechanisms 13, 14 for the middle left and right wheels MW1, MW2 by (in) the suspension mechanism 13, 14 can be generated). Furthermore, a component force of the generated rear wheel braking/driving force F3 can be generated (that is, an upward-and-downward force F3·tan θ3 which acts in the upward-and-downward direction (vertical direction) as a reaction force of the suspension mechanism 15, 16 for the rear left and right wheels RW1, RW2 by (in) the suspension mechanisms 15, 16 can be generated). Accordingly, when having/making the front left and right wheels FW1 FW2 generate the front wheel braking/driving force F1, having/making the middle left and right wheels MW1, MW2 generate the middle wheel braking/driving force F2, and having/making the rear left and right wheels RW1, RW2 generate the rear wheel braking/driving force F3, an acting force around the gravity center COG of the vehicle generated by the upward-and-downward force F1·tan θ1, the upward-and-downward force F2·tan θ2, and the upward-and-downward force F3·tan θ3, each acting on the vehicle body Bo, can be geometrically determined according to the above formula 1 based on the arrangement/disposition of the suspension mechanisms 11-16.

As in the case of the present embodiment, if the vehicle Ve has the six wheels of the front left and right wheels FW1 FW2, the middle left and right wheels MW1, MW2, and the rear left and right wheels RW1, RW2, the heave behavior and the pitching behavior of the vehicle body Bo can be controlled independently from each other, without causing the forward-and-backward movement of the vehicle Ve (that is, without causing unnecessary acceleration (or deceleration) when generating the front wheel braking/driving force F1, the middle wheel braking/driving force F2, and the rear wheel braking/driving force F3). This will be further described, however, in order to facilitate understanding of the description below, the description is made by exemplifying a case in which the front left and right wheels FW1 FW2 and the rear left and right wheels RW1, RW2 generate the front wheel braking/driving force F1 and the rear wheel braking/driving force F3, respectively, to control the heave behavior and the pitching behavior; and the middle left and right wheels MW1, MW2 generate the middle wheel braking/driving force F2 without moving in the upward-and-downward direction (in other words, $\theta 2$ is equal to "0", and thus, the suspension mechanisms 13, 14 does not generate the upward-and-downward force F2·tan $\theta 2$ as the reaction force).

In this case, for example, by having/making the front left and right wheels FW1 FW2 generate the front wheel braking/driving force F1 (relative driving force) which acts in the forward direction of the vehicle Ve, and by having/making the rear left and right wheels RW1, RW2 generate the rear wheel braking/driving force F3 (relative braking force) which acts in the backward direction of the vehicle Ve, the suspension mechanisms 11, 12 and the suspension mechanisms 15, 16 can apply to the vehicle body Bo the upward-and-downward force F1·tan $\theta 1$ and the upward-and-downward force F3·tan $\theta 3$, being the reaction forces, and both acting in the downward direction of the vehicle Ve. Further, for example, by having/making the front left and right wheels FW1 FW2 generate the front wheel braking/driving force F1 (relative braking force) which acts in the backward direction of the vehicle Ve, and by having/making the rear left and right wheels RW1, RW2 generate the rear wheel braking/driving force F3 (relative driving force) which acts in the forward direction of the vehicle Ve, the suspension mechanisms 11, 12 and the suspension mechanisms 15, 16 can apply to the vehicle body Bo the upward-and-downward force F1·tan $\theta 1$ and the upward-and-downward force F3·tan $\theta 3$, being the reaction forces, and both acting in the upward direction of the vehicle Ve.

According to the above, when the heave behavior in which the front side portion and the rear side portion of the vehicle body Bo vibrate in the substantially same phase with each other occurs, the occurring heave behavior can be appropriately suppressed by applying the upward-and-downward force F1·tan $\theta 1$ and the upward-and-downward force F3·tan $\theta 3$ to the vehicle body Bo. In addition, in this case, when the front wheel braking/driving force F1 and the rear wheel braking/driving force F3, having the same magnitude as each other, are generated, if the upward-and-downward force F1·tan $\theta 1$ and the upward-and-downward force F3·tan $\theta 3$ have the same magnitude as each other (i.e., front-rear symmetric), the front wheel braking/driving force F1 and the rear wheel braking/driving force F3, that are generated to control the heave behavior, have the same magnitude as each other and have the opposite acting direction to each other so that they cancel each other, and therefore, the unnecessary forward-and-backward movement of the vehicle Ve does not occur.

On the other hand, when the pitching behavior in which the front side portion and the rear side portion of the vehicle body Bo vibrate in the substantially opposite phase to each other occurs, the occurring pitching behavior can be appropriately suppressed by applying the upward-and-downward force F1·tan $\theta 1$ and the upward-and-downward force F3·tan $\theta 3$ to the vehicle body Bo. Note, however, that when the pitching behavior occurs, the front side portion and the rear side portion of the vehicle body Bo vibrate in the substantially opposite phase to each other, and thus, it is necessary to have/make the magnitude and/or the acting direction of the upward-and-downward force F1·tan $\theta 1$ and the upward-and-downward force F3·tan $\theta 3$, both applied to the vehicle body Bo, change differently from (opossitely to) each other, in contrast to the case of the heave behavior. In this case, if the vehicle Ve has the above mentioned front-rear symmetry, it is necessary to have/make the magnitude and/or acting direction of the front wheel braking/driving force F1 and the rear wheel braking/driving force F3 (the relative driving force or the relative braking force) change with (be different from) each other, and therefore, it is necessary to accept/allow the forward-and-backward movement of the vehicle Ve. Accordingly, for example, when controlling the heave behavior and the pitching behavior independently from each other (simultaneously) by the four wheels of the front left and right wheels FW1 and FW2, and the rear left and right wheels RW1, and RW2, under the above mentioned front-rear symmetry, it is necessary to accept/allow the forward-and-backward movement of the vehicle Ve.

In the meantime, the middle left and right wheels MW1, MW2 are provided in the present embodiment, the middle wheel braking/driving force F2 generated by the middle left and right wheels MW1, MW2 can cancel the forward-and-backward movement of the vehicle Ve (cancel the forward-and-backward force) caused by the control of the heave behavior and the pitching behavior. That is, especially, the forward-and-backward movement of the vehicle occurred when controlling the heave behavior and the pitching behavior, as described above, is caused by a relative relation between the front wheel braking/driving force F1 and the rear wheel braking/driving force F3 (that is, a sum of the braking/driving forces and/or a difference between the braking/driving forces). Therefore, the forward-and-backward movement of the vehicle Ve (the forward-and-backward force) can be canceled by having/making the middle left and right wheels MW1, MW2 generate the middle wheel braking/driving force F2 which corresponds to the sum of and/or the difference between the front wheel braking/driving force F1 and the rear wheel braking/driving force F3. It should be noted that the heave behavior and the pitching behavior can be controlled as long as the above described formula 1 is satisfied, even if the middle left and right wheels MW1, MW2 generate the middle wheel braking/driving force F2 by moving in the upward-and-downward direction (in other words, when the suspension mechanisms 13, 14 generate the upward-and-downward force F2·tan $\theta 2$ as the reaction force by the middle wheel braking/driving force F2).

Note, however, there may be a case in which the heave behavior and the pitching behavior cannot be controlled independently (simultaneously) according to the above described formula 1 while excluding (without) the forward-and-backward movement of the vehicle Ve, depending on the momentary rotation angles $\theta 1$, $\theta 2$, and $\theta 3$, indicative of operating states of the suspension mechanisms 11-16. That is, as is clear from the above described formula 1, the heave behavior and the pitching behavior cannot be controlled independently (simultaneously) when an independence of each row of the coefficient matrix in the formula 1 and an independence of each column of the coefficient matrix in the formula 1 cannot be secured. In such a case in which those independences cannot be secured (i.e., being dependent), conditions a. to f. in the formula 2 described below are satisfied.

$$\tan\theta 1 = \tan\theta 2 = \tan\theta 3 \quad \text{a.}$$

$$-Lc\tan\theta 1 = (L1-Lc)\tan\theta 2 = (L1+L2-Lc)\tan\theta 3 \quad \text{b.}$$

$$-Lc = L1-Lc = L1+L2-Lc \quad \text{c.}$$

$$\tan\theta 1 = \tan\theta 2 \text{ and } L1 = 0 \quad \text{d.}$$

$$\tan\theta 2 = \tan\theta 3 \text{ and } L2 = 0 \quad \text{e.}$$

$$\tan\theta 1 = \tan\theta 3 \text{ and } L1 = -L2 \quad \text{f. Formula 2.}$$

The condition c. is for a two wheeled vehicle, and conditions d. to f. are for a four wheeled vehicle. Accordingly, in a case of the present embodiment in which the vehicle Ve is the six wheeled vehicle, the dependency conditions include the predetermined condition a. being $\tan\theta 1 = \tan\theta 2 = \tan\theta 3$, and the predetermined condition b. being $-Lc\tan\theta 1 = (L1-Lc)\tan\theta 2 = (L1+L2-Lc)\tan\theta 3$. It should be noted that the condition b. of the dependency conditions represents a case, as shown in FIG. 4, in which an intersection point between a line connecting the contact point (with a road) of the front left and right wheels FW1 FW2 with its corresponding momentary center Cf and a vertical (normal) line from the gravity center COG, an intersection point between a line connecting the contact point (with a road) of the middle left and right wheels MW1, MW2 with its corresponding momentary center Cm and the vertical line, and an intersection point between a line connecting the contact point (with a road) of the rear left and right wheels RW1, RW2 with its corresponding momentary center Cr and the vertical line, all coincide with each other (at one point).

Referring back to the flowchart shown in FIG. 2 again, the control unit 41 determines whether or not any one of the condition a. being $\tan\theta 1 = \tan\theta 2 = \tan\theta 3$ and the condition b. being $-Lc\tan\theta 1 = (L1-Lc)\tan\theta 2 = (L1+L2-Lc)\tan\theta 3$, both being dependent conditions for the six wheeled vehicle Ve, is satisfied at step S15. When any one of the above described dependent conditions of a. and b. is satisfied (in other words, when the heave behavior and the pitching behavior cannot be independently (simultaneously) controlled), the control unit 41 makes a "Yes" determination to proceed to step S16. At step S16, the control unit 41 sets all of the front wheel braking/driving force F1, the middle wheel braking/driving force F2, and the rear wheel braking/driving force F3 to (at) "0 (zero)" to proceed to step S18.

On the other hand, neither the above described dependent condition a. nor the condition b. is satisfied (in other words, when the heave behavior and the pitching behavior can be independently (simultaneously) controlled), the control unit 41 makes a "No" determination at step S15 to proceed to step S17. At step S17, the control unit 41 calculates the front wheel braking/driving force F1, the middle wheel braking/driving force F2, and the rear wheel braking/driving force F3, using the formula 1 described above and the formula 3 described below. As long as the front wheel braking/driving force F1, the middle wheel braking/driving force F2, and the rear wheel braking/driving force F3 satisfy the formula 3 described below, the forward-and-backward movement (forward-and-backward acceleration) of the vehicle Ve is canceled out.

$$F1+F2+F3=0 \quad \text{Formula 3}$$

After the control unit 41 determines the front wheel braking/driving force F1, the middle wheel braking/driving force F2, and the rear wheel braking/driving force F3, the unit 41 proceeds to step S18.

At step S18, the control unit 41 uses each of the detected values including the acceleration operating amount, the throttle valve opening, the braking operation amount, the vehicle speed, or the like, obtained at step S12 described above so as to calculate the target required driving force Fd which has a predetermined relation with those detected values representing the intention of the driver. After the control unit 41 calculates the target required driving force Fd, the unit 41 proceeds to step S19.

At step S19, the control unit 41 calculates a target front wheel braking/driving force F1* to be finally generated by the front left and right wheels FW1 FW2; a target middle wheel braking/driving force F2* to be finally generated by the middle left and right wheels MW1, MW2; and a target rear wheel braking/driving force F3* to be finally generated by the rear left and right wheels RW1, RW2, by applying the front wheel braking/driving force F1, the middle wheel braking/driving force F2, and the rear wheel braking/driving force F3, calculated at step S16 or S17, to the formula 4 described below.

$$F1^* = F1 + \frac{1}{3}Fd \quad \text{Formula 4}$$
$$F2^* = F2 + \frac{1}{3}Fd$$
$$F3^* = F3 + \frac{1}{3}Fd$$

After the control unit 41 calculates the target front wheel braking/driving force F1*, the target middle wheel braking/driving force F2*, and the target rear wheel braking/driving force F3*, the unit 41 proceeds to step S20.

At step S20, the control unit 41 drives each of the in-wheel motors 21-26 by controlling a driving current supplied to each of the in-wheel motors 21-26 according to the target front wheel braking/driving force F1*, the target middle wheel braking/driving force F2*, and the target rear wheel braking/driving force F3*, calculated at step S19 described above. More specifically, the control unit 41 supplies/sends driving instructions indicative of the calculated target front wheel braking/driving force F1*, the calculated target middle wheel braking/driving force F2*, and the calculated target rear wheel braking/driving force F3* to the inverter 27. The inverter 27 supplies, based on the driving instructions, each driving current to each of the in-wheel motors 21-26. Accordingly, the front wheel braking/driving force F1 and the distributed force (Fd/3) of the target required driving force Fd can be generated by (at) the front left and right wheels FW1 FW2; the middle wheel braking/driving force F2 and the distributed force (Fd/3) of the target required driving force Fd can be generated by (at) the middle left and right wheels MW1, MW2; and the rear wheel braking/driving force F3 and the distributed force (Fd/3) of the target required driving force Fd can be generated by (at) the rear left and right wheels RW1, RW2.

After the control unit drives each of the in-wheel motors 21-16 at step S20 described above, the control unit proceeds to step S21 to end the execution of the vehicle body behavior control program tentatively. Thereafter, the predetermined short time period elapses, the control unit 41 again starts the execution of the vehicle body behavior control program from step S10.

As understood from the above description, when the front wheel braking/driving force F1 at (for) the front left and right wheels FW1 FW2 is controlled and the rear wheel braking/driving force F3 at (for) the rear left and right wheels RW1, RW2 is controlled, there is a possibility that the forward-and-backward movement of the vehicle Ve occurs. In the present embodiment, however, the control unit 41 can control the middle wheel braking/driving force F2 at (for, of) the middle left and right wheels MW1, MW2, provided separately from the front left and right wheels FW1 FW2 and the rear left and right wheels RW1, RW2, in accordance with (in addition to) the control for the front wheel braking/driving force F1 and the rear wheel braking/driving force F3, such that the forward-and-backward movement that would occur on the vehicle Ve is suppressed. Accordingly, the heave behavior and the pitching behavior, that occur while coupling with each other, can be controlled independently (and simultaneously) without causing the unnecessary forward-and-backward movement of the vehicle Ve. As a result, the driver does not notice/feel the unpleasant forward-and-backward movement of the vehicle Ve.

Further, when the stroke amounts of the suspension mechanisms 11-16 change so that the momentary rotation angles $\theta 1$, $\theta 2$, and $\theta 3$ change to satisfy any one of the predetermined independent condition a. being $\tan \theta 1 = \tan \theta 2 = \tan \theta 3$ and the predetermined independent condition b. being $-Lc \tan \theta 1 = (L1 - Lc)\tan \theta 2 = (L1 + L2 - Lc)\tan \theta 3$, that is, when it becomes difficult to independently (simultaneously) control the heave behavior and the pitching behavior, the front wheel braking/driving force F1, the middle wheel braking/driving force F2, and the rear wheel braking/driving force F3 can be determined to be set to zero. Accordingly, the influence caused by a change in force (characteristic) input into the vehicle body Bo as well as the generation of the unnecessary forward-and-backward movement of the vehicle Ve can be effectively reduced.

The present invention is not limited to the embodiment(s) described above, and various modifications may be adopted without departing from the scope of the invention.

For example, in the above embodiment, the middle left and right wheels MW1, MW2 are supported by the suspension mechanisms 13, 14 so that they can move in the upward-and-downward direction. However, the suspension mechanisms 13, 14 can be omitted, since the necessary function of the middle left and right wheels MW1, MW2 is to generate at least the middle wheel braking/driving force F2 in the forward-and-backward direction of the vehicle Ve, as described before. Even in this case, the heave behavior and the pitching behavior of the vehicle body Bo can be controlled independently (and simultaneously) by determining (calculating) the front wheel braking/driving force F1, the middle wheel braking/driving force F2, and the rear wheel braking/driving force F3, such that the formula 1 (and the formula 3) described above is satisfied, resulting in achieving the same effect as one that the above described embodiment can achieve.

Further, the above embodiment is the six wheeled vehicle Ve, which is configured by adding the middle left and right wheels MW1, MW2 to the front left and right wheels FW1 FW2 and the rear left and right wheels RW1, RW2, with which a typical vehicle usually is equipped. However, the number of wheels, as the middle wheels, added to the front left and right wheels FW1 FW2 and the rear left and right wheels RW1, RW2 is not limited to two, the present invention may be carried out by a vehicle in which four or more of the middle wheels are added, as the middle wheels. Even in this case, the added middle wheels can cancel the forward-and-backward movement (forward-and-backward force) of the vehicle that would occur when the heave behavior and the pitching behavior are independently (simultaneously) controlled, resulting in achieving the same effect as one that the above described embodiment can achieve.

Further, in the above embodiment, each of the in-wheel motors 21-26 constituting the force generating mechanism is installed in each of the front left and right wheels FW1 FW2, the middle left and right wheels MW1, MW2, and the rear left and right wheels RW1, RW2. However, as long as the front wheel braking/driving force F1, the middle wheel braking/driving force F2, and the rear wheel braking/driving force F3 can be generated independently from each other, it is not necessary to install each of the in-wheel motors 21-26 into each of the wheels, but any type of configuration can be adopted.

Specifically, a configuration can be adopted where the front wheel braking/driving force F1, the middle wheel braking/driving force F2, and the rear wheel braking/driving force F3 are generated by supplying, independently from each other, an appropriate force (torque) to each of axle shafts, each rotatably supporting each of the front left and right wheels FW1 FW2, the middle left and right wheels MW1, MW2, and the rear left and right wheels RW1, RW2. Note, however, when this modified configuration is adopted, the momentary rotation angles $\theta 1$, $\theta 2$, and $\theta 3$, described in the above described embodiment, are respective angles between a horizontal line and a line segment connecting centers of the axle shafts, each supporting each of the front left and right wheels FW1 FW2, the middle left and right wheels MW1, MW2, and the rear left and right wheels RW1, RW2, with the momentary centers Cf, Cm, and Cr, respectively.

The invention claimed is:

1. A vehicle behavior control apparatus comprising:
   a force generating mechanism which makes front wheels and rear wheels of a vehicle generate a driving force or a braking force, independently from each other;
   suspension mechanisms, each of which connects each of said front wheels and said rear wheels, both arranged as unsprung articles of said vehicle, to a vehicle body arranged as a sprung article of said vehicle; and
   a control section which controls said driving force or said braking force that said force generating mechanism makes said front wheels and said rear wheels generate, in accordance with behaviors of said vehicle body;
   wherein,
   said force generating mechanism makes wheels provided separately from said front and said rear wheels generate a driving force or a braking force, independently,
   said control section:
   obtains a state of a movement of said vehicle body when said vehicle is running;
   calculates, based on said obtained state of said movement, a plurality of target movement state amounts for controlling at least behaviors which are coupled with each other among behaviors of said vehicle body;
   calculates said driving force or said braking force that said force generating mechanism makes said front and rear wheels generate, and said driving force or said braking force that said force generating mechanism makes said wheels provided separately from said front and rear wheels generate, such that a plurality of said calculated target movement state amounts are achieved; and
   controls an operation of said force generating mechanism using signals indicative of said calculated driving force or said calculated braking force that said force generating mechanism makes said front and rear wheels generate, and a signal indicative of said calculated driving force or said calculated braking force that said force generating mechanism makes said wheels provided separately from said front and rear wheels generate.

2. The vehicle behavior control apparatus according to claim 1, wherein,
said control section calculates said driving force or said braking force that said force generating mechanism makes said front and rear wheels generate, and said driving force or said braking force that said force generating mechanism makes said wheels provided separately from said front and rear wheels generate, using a distribution which is geometrically determined, based on a geometry among at least said front and rear wheels and said suspension mechanisms in said vehicle, such that a plurality of said calculated target movement state amounts are achieved.

3. The vehicle behavior control apparatus according to claim 2, wherein,
said control section sets, when an operating state of said suspension mechanisms, varying depending on a behavior change of said vehicle body, satisfies a predetermined condition, both said driving force or said braking force that said force generating mechanism makes said front and rear wheels generate, and said driving force or said braking force that said force generating mechanism makes said wheels provided separately from said front and rear wheels generate, at zero, such that a plurality of said calculated target movement state amounts are achieved.

4. The vehicle behavior control apparatus according to claim 3, wherein,
said predetermined condition is a condition which momentary rotation angles should satisfy, each of said momentary rotation angles being indicative of an operating state of each of said suspension mechanisms, and corresponding to a change in height of said vehicle body caused by said behavior change of said vehicle body,
said control section determines to set both said driving force or said braking force that said force generating mechanism makes said front and rear wheels generate, and said driving force or said braking force that said force generating mechanism makes said wheels provided separately from said front and rear wheels generate to zero such that a plurality of said calculated target movement state amounts are achieved, when said momentary rotation angles of said suspension mechanisms satisfy said predetermined condition, said momentary rotation angle being obtained according to said change in said height of said vehicle body while said vehicle is running.

5. The vehicle behavior control apparatus according to claim 1, wherein,
said behaviors which are coupled with each other are a heave behavior in which said front side portion of said vehicle body and rear side portion of said vehicle body vibrate vertically in the substantially same phase with each other and a pitching behavior in which said front side portion and said rear side portion vibrate vertically in the substantially opposite phase to each other; and
said control section calculates at least a target heave force to suppress said heave behavior and a target pitching moment to suppress said pitching behavior.

6. The vehicle behavior control apparatus according to claim 5, wherein,
said control section calculates said driving force or said braking force that said wheels provided separately from said front and rear wheels are made to generate such that at least said forward-and-backward movement of said vehicle is suppressed, said forward-and-backward movement being caused by said driving force or said braking force that said front and rear wheels generate to achieve said calculated target heave force and said target pitching moment.

7. The vehicle behavior control apparatus according to claim 1, wherein,
said suspension mechanism further connects said wheels provided as unsprung articles, and separately from said front and rear wheels, to said vehicle body.

8. The vehicle behavior control apparatus according to claim 1, wherein,
said wheels provided separately from said front and rear wheels are arranged between said front wheels and said rear wheels, with respect to said vehicle body.

9. The vehicle behavior control apparatus according to claim 1, wherein,
said force generating mechanism includes electric motors, each of which is installed in each of said wheels of said vehicle.

\* \* \* \* \*